United States Patent [19]
Yanagisawa et al.

[11] Patent Number: 5,673,161
[45] Date of Patent: Sep. 30, 1997

[54] LOW WEAR RATE MAGNETIC HEAD SLIDER WITH HIGH RECORDING DENSITY

[75] Inventors: Masahiro Yanagisawa; Akinobu Sato; Ken Ajiki, all of Tokyo, Japan

[73] Assignee: NEC Corporation, Japan

[21] Appl. No.: 617,242

[22] Filed: Mar. 18, 1996

[30] Foreign Application Priority Data

Mar. 24, 1995 [JP] Japan .................. 7-065795

[51] Int. Cl.$^6$ .................. G11B 5/60; G11B 5/48
[52] U.S. Cl. .................. 360/103; 360/104
[58] Field of Search .................. 360/104, 103

[56] References Cited

U.S. PATENT DOCUMENTS

| | | | |
|---|---|---|---|
| 5,166,845 | 11/1992 | Thompson | 360/104 |
| 5,504,639 | 4/1996 | Kawazoe | 360/103 |
| 5,530,605 | 6/1996 | Hamaguchi | 360/104 |

OTHER PUBLICATIONS

"Contact Recording On Perpendicular Rigid Media" by Harold Hamilton, Journal of the Magnetics Society of Japan Vol. 15 Supplement, No. S2 (1991), pp. 483–490 No month.
"Contact Perpendicular Recording With Integrated Head/Flexure" by H. Hamilton et al., TRIB–Vol. 3, Concepts in Contact Recording, ASME 1992, pp. 13–23 No month.

*Primary Examiner*—A. J. Heinz
*Attorney, Agent, or Firm*—Hayes, Soloway, Hennessey, Grossman & Hage, P.C.

[57] ABSTRACT

A magnetic disk device includes a magnetic head for performing recording and reproduction with respect to a magnetic disk medium, and an actuator for driving the magnetic head. The magnetic head includes a magnetic recording/reproducing element, a contact magnetic head slider on which the magnetic recording/reproducing element is mounted, the magnetic head slider having a press load of 1 gf or less, and a mass of 2 mg or more, and a support mechanism for supporting the magnetic head slider.

21 Claims, 6 Drawing Sheets

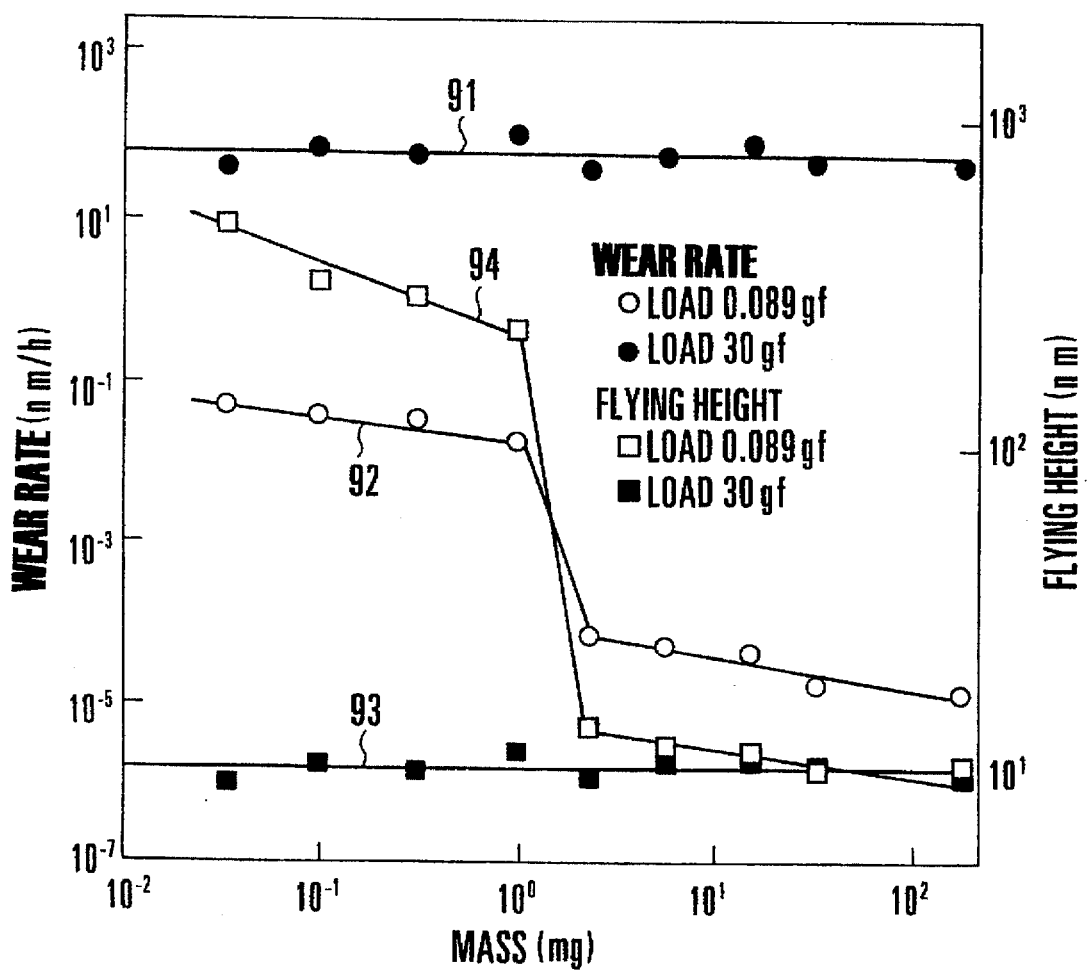
F I G. 9

LOW WEAR RATE MAGNETIC HEAD SLIDER WITH HIGH RECORDING DENSITY

BACKGROUND OF THE INVENTION

The present invention relates to a magnetic disk device used for a peripheral storage unit of a computer or the like.

Recently, in the field of information storage files, magnetic disk device recording density has steadily been increased, and important factors for achieving high recording density are an increase in the recording density (i.e., a recording density per track and per unit length; to be referred to as a line recording density hereinafter) of information strings (to be referred to as tracks hereinafter) recorded in a circumferential direction, and further an increase in radial recording density (i.e., the number of tracks per unit length; to be referred to as track density hereinafter), by decreasing the interval (to be referred to as the spacing hereinafter) between the magnetic head for reading/writing information and the magnetic disk medium holding information. In a hard magnetic disk device using a hard substrate as the magnetic disk medium, a magnetic head slider using an air bearing force so as to reduce the spacing has been decreased in both load and mass, i.e., downsizing has progressed. Further, a contact magnetic head slider, for a hard magnetic disk device, which does not utilize the air bearing force has been developed (e.g., Journal of the Magnetic Society (H. Hamilton: Journal of the Magnetic Society of Japan, Vol. 15, Supplement No. S2 (1991) 483–490). The characteristic feature of this contact magnetic head slider is downsizing with decreases in load and mass. The above reference describes a contact magnetic head slider with a mass of 30 µg and a load of 10 mgf to 120 mgf. In addition, for example, a contact magnetic head slider with a mass of 1 mg and a load of 20 to 50 mgf is described in H. Hamilton: Concepts in Contact Recording, ASME 1992, TRIB-Vol. 3 (1992) 13–23.

As an example using a magnetic head in contact with a magnetic disk medium, a flexible magnetic disk (floppy disk) using a soft substrate for the magnetic disk medium is well known.

To increase the track density, a decrease in the radial width of a recording/reproducing element provided to a magnetic head has been attempted.

In the air bearing magnetic head slider, however, it is difficult to set the load to 1 gf or less so as to obtain a stable air bearing force. A reduction in spacing makes intermittent contact with the magnetic disk medium inevitable. In addition to this, since the magnetic head is easily affected by dust, the magnetic head and the magnetic disk contact each other with a large impact force due to disturbance of the air bearing force, and the magnetic head or the magnetic disk medium is worn out. As a result, the probability of loss of stored information increases.

In the contact magnetic head slider used for the hard magnetic disk, the load and the mass can be decreased, but wear resistance is not sufficient against continuous contact wear. Further, the contact magnetic head flies on the magnetic disk due to friction between the solid contact magnetic head slider and the solid magnetic disk medium or vibration of the magnetic head slider caused by the corrugations or surface roughness of the magnetic disk medium, and thus fails to obtain stable, small spacing. For this reason, the position and timing of the magnetically reproduced signal greatly varies thereby resulting in generation of a read error signal, and also the recording density cannot be increased. If the track density is increased, a track written in the magnetic disk medium and the recording/reproducing element of the magnetic head shift relative to each other due to a radial vibration of the magnetic head, and the read error increases with the variations in the position and timing of the magnetic reproduced signal.

In the contact magnetic head used for the flexible magnetic disk device, although the mass is high, the load is also heavy, and wear resistance is not sufficient against continuous contact wear. Particularly in the flexible magnetic disk device, the magnetic disk is generally slid at a speed as low as 360 rps. If the magnetic disk is slid at a speed as high as 5,000 rps, as in the hard magnetic disk device, the flexible magnetic disk device has no wear resistance at all.

SUMMARY OF THE INVENTION

It is an object of the present invention to provide a magnetic disk device using a highly reliable contact magnetic head with a high recording density.

In order to achieve the above object, according to the present invention, there is provided a magnetic disk device comprising a magnetic head for performing recording and reproduction with respect to a magnetic disk medium, and driving means for driving the magnetic head, wherein the magnetic head comprises a magnetic recording/reproducing element, a contact magnetic head slider on which the magnetic recording/reproducing element is mounted, the magnetic head slider having a press load of not more than 1 gf, and a mass of not less than 2 mg, and a support mechanism for supporting the magnetic head slider.

BRIEF DESCRIPTION OF THE DRAWINGS

FIG. 9 is a graph showing the wear rate and the dependence of the flying height on the load in the contact magnetic head slider used in the magnetic disk device of the present invention, using the load as a parameter.

DESCRIPTION OF THE PREFERRED EMBODIMENT

An embodiment of the present invention will be described below.

(Example 1)

Figure 1:
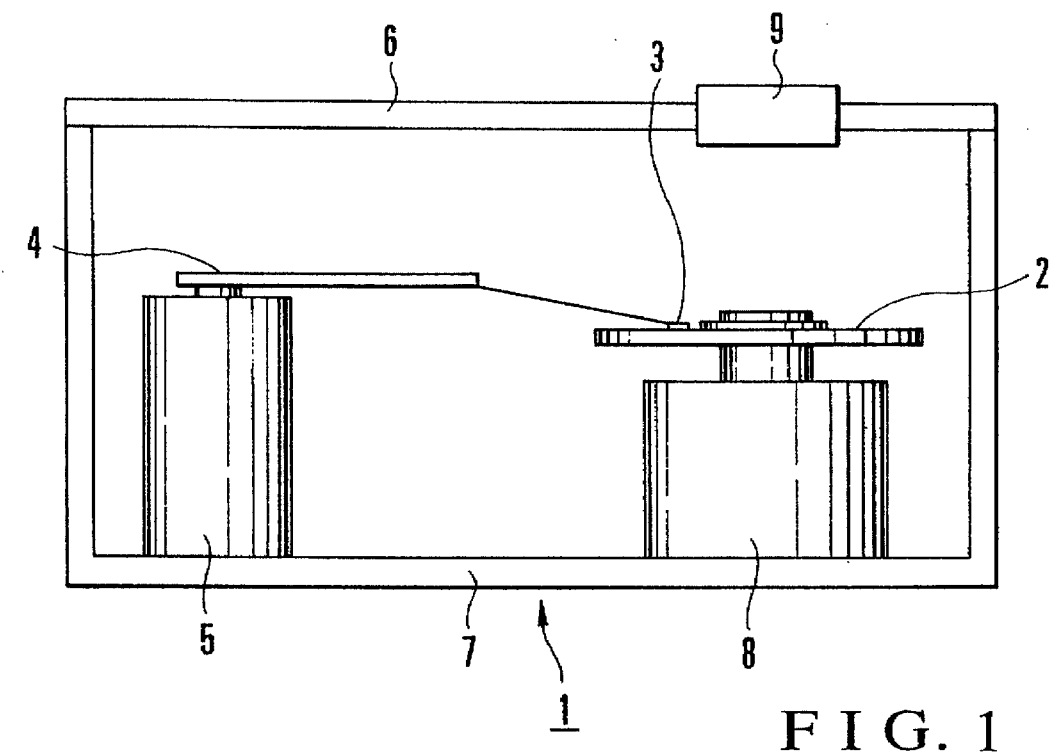
FIG. 1 is a side view showing a magnetic disk device of the present invention.
Figure 2:
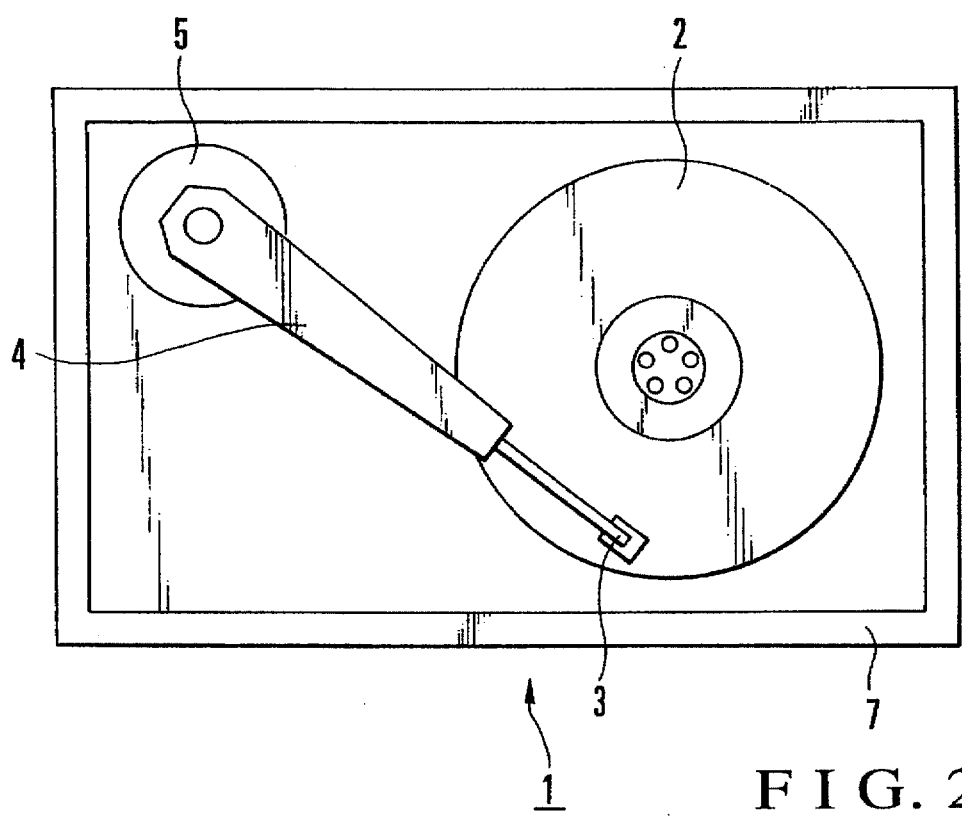
FIG. 2 is a front view showing the magnetic disk device of the present invention.
Figure 3:
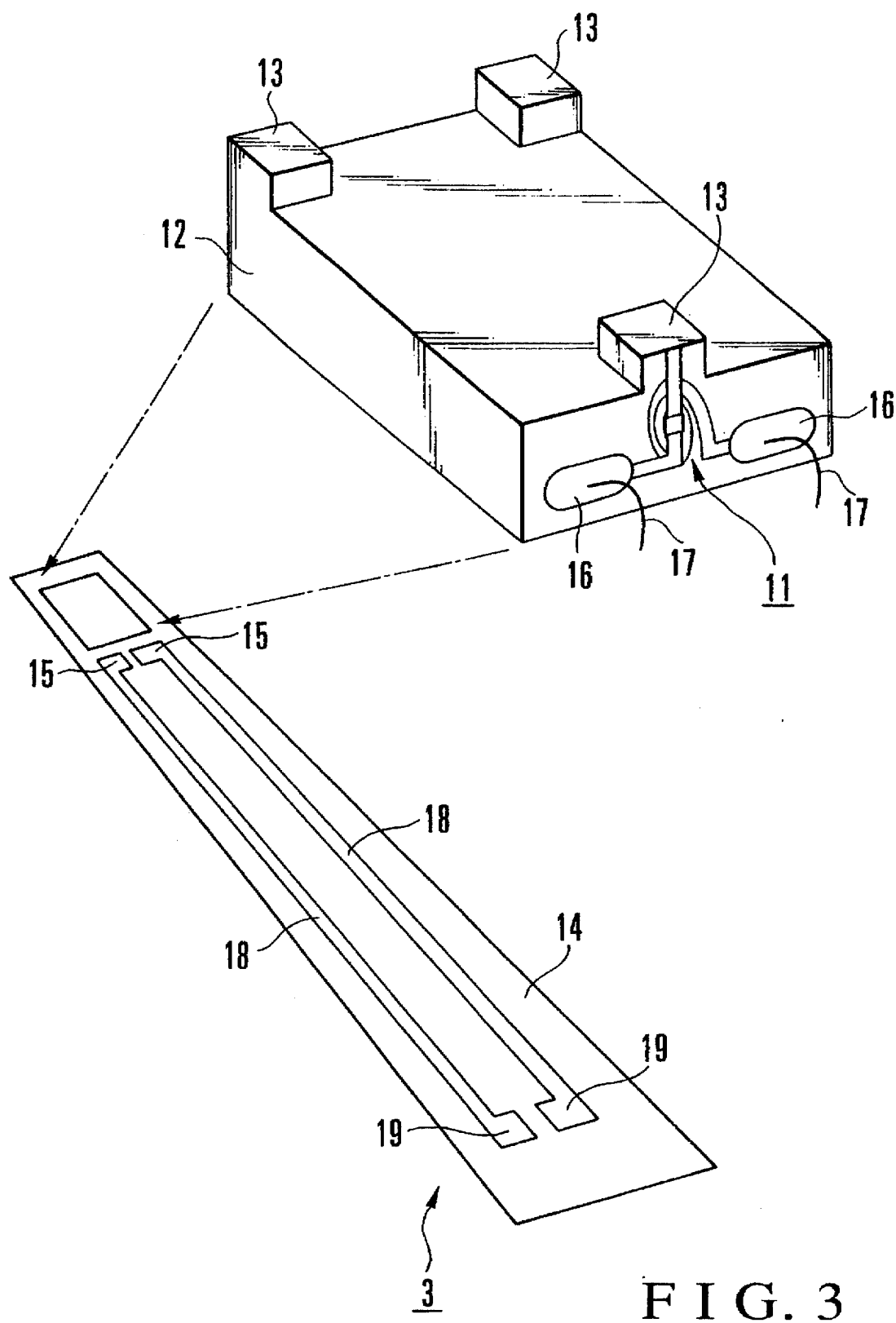
FIG. 3 is a perspective view showing an example of a contact magnetic head shown in FIGS. 1 and 2.

Each sample was fabricated as a component of a magnetic disk device of the present invention shown in FIGS. 1 and 2 in accordance with the basic arrangement of a contact magnetic head 3 shown in FIG. 3. As shown in FIG. 3, three contact pads 13 each having a flat surface whose area was 20 μm (width)×20 μm (length) were formed by machining on the surface of each $Al_2O_3$.TiC magnetic head slider 12 whose length, width, and height were L mm, W mm, and H mm (shown in Table 1). Each magnetic head slider 12 had a magnetic recording/reproducing element 11 on its rear end face. The contact pads 13 were formed at the center of the edge, on the slider 12 surface, corresponding to the rear end face having the magnetic recording/reproducing element 11, and at two corners on the front end side opposite to this edge, respectively. The mass of each slider 12 is also shown in Table 1. Each slider 12 was adhered to the distal end of each stainless steel support spring 14 whose thickness, width, and length are D mm, 0.5 mm, and 10 mm, thereby fabricating each contact magnetic head 3 whose load and mass were changed, as shown in Table 1.

Figure 5:
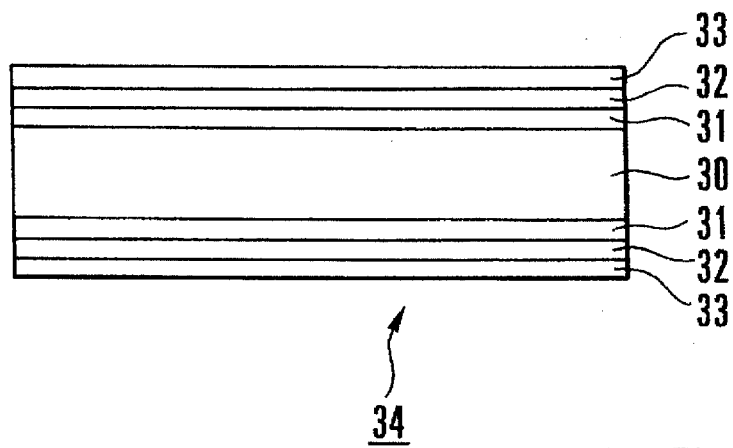
FIG. 5 is a view showing an example of the arrangement of a hard magnetic disk medium shown in FIGS. 1 and 2.

Further, as a magnetic disk medium 2, a hard magnetic disk medium 34 was fabricated in accordance with the basic arrangement shown in FIG. 5. More specifically, CoPtCr was sputtered on a 1.8" glass substrate serving as a hard magnetic disk substrate 30 to form a 20-nm thin magnetic film 31. 10%-hydrogen-added carbon was sputtered on the thin magnetic film 31 to form a 5-nm protective film 32. The surface of the protective film 32 was dipped in perfluoropolyether serving as a lubricant 33 and covered with the 2-nm perfluoropolyether film.

As shown in FIG. 1, each contact magnetic head 3 was attached to a head arm 4, which was attached to an actuator 5, as a magnetic head driving means, attached to a base 7. The magnetic disk medium 2 was attached to the shaft of a motor 8 attached to the base 7. Assembly was performed with the contact magnetic head 3 being in contact with the magnetic disk medium 2 through the contact pads 13. Finally, a cover 6 having a filter 9 was mounted on the base 7 so as to allow ventilation of the outer air only through the filter 9, thereby fabricating a magnetic disk device 1.

TABLE 1

| Sample Number | Length L (mm) | Width W (mm) | Height H (mm) | Material | Mass (mg) | Support Spring | Thickness D (mm) | Load (gf) |
|---|---|---|---|---|---|---|---|---|
| 1 | 5.6 | 3.9 | 1.9 | $Al_2O_3$.TiC | 181 | Stainless steel | 0.5 | 139 |
| 2 | 4.0 | 3.2 | 0.9 | $Al_2O_3$.TiC | 40 | Stainless steel | 0.5 | 139 |
| 3 | 2.9 | 2.3 | 0.7 | $Al_2O_3$.TiC | 15 | Stainless steel | 0.5 | 139 |
| 4 | 2.0 | 1.6 | 0.4 | $Al_2O_3$.TiC | 6.0 | Stainless steel | 0.5 | 139 |
| 5 | 1.25 | 1.0 | 0.3 | $Al_2O_3$.TiC | 2.0 | Stainless steel | 0.5 | 139 |
| 6 | 0.90 | 0.70 | 0.3 | $Al_2O_3$.TiC | 1.0 | Stainless steel | 0.5 | 139 |
| 7 | 0.60 | 0.48 | 0.3 | $Al_2O_3$.TiC | 0.38 | Stainless steel | 0.5 | 139 |
| 8 | 0.30 | 0.25 | 0.3 | $Al_2O_3$.TiC | 0.10 | Stainless steel | 0.5 | 139 |
| 9 | 0.20 | 0.15 | 0.3 | $Al_2O_3$.TiC | 0.04 | Stainless steel | 0.5 | 139 |
| 10 | 5.6 | 3.9 | 1.9 | $Al_2O_3$.TiC | 181 | Stainless steel | 0.3 | 30 |
| 11 | 4.0 | 3.2 | 0.9 | $Al_2O_3$.TiC | 40 | Stainless steel | 0.3 | 30 |
| 12 | 2.9 | 2.3 | 0.7 | $Al_2O_3$.TiC | 15 | Stainless steel | 0.3 | 30 |
| 13 | 2.0 | 1.6 | 0.4 | $Al_2O_3$.TiC | 6.0 | Stainless steel | 0.3 | 30 |
| 14 | 1.25 | 1.0 | 0.3 | $Al_2O_3$.TiC | 2.0 | Stainless steel | 0.3 | 30 |
| 15 | 0.90 | 0.70 | 0.3 | $Al_2O_3$.TiC | 1.0 | Stainless steel | 0.3 | 30 |
| 16 | 0.60 | 0.48 | 0.3 | $Al_2O_3$.TiC | 0.38 | Stainless steel | 0.3 | 30 |
| 17 | 0.30 | 0.25 | 0.3 | $Al_2O_3$.TiC | 0.10 | Stainless steel | 0.3 | 30 |
| 18 | 0.20 | 0.15 | 0.3 | $Al_2O_3$.TiC | 0.04 | Stainless steel | 0.3 | 30 |
| 19 | 5.6 | 3.9 | 1.9 | $Al_2O_3$.TiC | 181 | Stainless steel | 0.2 | 8.9 |
| 20 | 4.0 | 3.2 | 0.9 | $Al_2O_3$.TiC | 40 | Stainless steel | 0.2 | 8.9 |
| 21 | 2.9 | 2.3 | 0.7 | $Al_2O_3$.TiC | 15 | Stainless steel | 0.2 | 8.9 |
| 22 | 2.0 | 1.6 | 0.4 | $Al_2O_3$.TiC | 6.0 | Stainless steel | 0.2 | 8.9 |
| 23 | 1.25 | 1.0 | 0.3 | $Al_2O_3$.TiC | 2.0 | Stainless steel | 0.2 | 8.9 |
| 24 | 0.90 | 0.70 | 0.3 | $Al_2O_3$.TiC | 1.0 | Stainless steel | 0.2 | 8.9 |
| 25 | 0.60 | 0.48 | 0.3 | $Al_2O_3$.TiC | 0.38 | Stainless steel | 0.2 | 8.9 |
| 26 | 0.30 | 0.25 | 0.3 | $Al_2O_3$.TiC | 0.10 | Stainless steel | 0.2 | 8.9 |
| 27 | 0.20 | 0.15 | 0.3 | $Al_2O_3$.TiC | 0.04 | Stainless steel | 0.2 | 8.9 |
| 28 | 5.6 | 3.9 | 1.9 | $Al_2O_3$.TiC | 181 | Stainless steel | 0.15 | 3.76 |
| 29 | 4.0 | 3.2 | 0.9 | $Al_2O_3$.TiC | 40 | Stainless steel | 0.15 | 3.76 |
| 30 | 2.9 | 2.3 | 0.7 | $Al_2O_3$.TiC | 15 | Stainless steel | 0.15 | 3.76 |
| 31 | 2.0 | 1.6 | 0.4 | $Al_2O_3$.TiC | 6.0 | Stainless steel | 0.15 | 3.76 |
| 32 | 1.25 | 1.0 | 0.3 | $Al_2O_3$.TiC | 2.0 | Stainless steel | 0.15 | 3.76 |
| 33 | 0.90 | 0.70 | 0.3 | $Al_2O_3$.TiC | 1.0 | Stainless steel | 1.15 | 3.76 |
| 34 | 0.60 | 0.48 | 0.3 | $Al_2O_3$.TiC | 0.38 | Stainless steel | 0.15 | 3.76 |
| 35 | 0.30 | 0.25 | 0.3 | $Al_2O_3$.TiC | 0.10 | Stainless steel | 0.15 | 3.76 |
| 36 | 0.20 | 0.15 | 0.3 | $Al_2O_3$.TiC | 0.04 | Stainless steel | 0.15 | 3.76 |
| 37 | 5.6 | 3.9 | 1.9 | $Al_2O_3$.TiC | 181 | Stainless steel | 0.1 | 1.1 |
| 38 | 4.0 | 3.2 | 0.9 | $Al_2O_3$.TiC | 40 | Stainless steel | 0.1 | 1.1 |
| 39 | 2.9 | 2.3 | 0.7 | $Al_2O_3$.TiC | 15 | Stainless steel | 0.1 | 1.1 |
| 40 | 2.0 | 1.6 | 0.4 | $Al_2O_3$.TiC | 6.0 | Stainless steel | 0.1 | 1.1 |
| 41 | 1.25 | 1.0 | 0.3 | $Al_2O_3$.TiC | 2.0 | Stainless steel | 0.1 | 1.1 |
| 42 | 0.90 | 0.70 | 0.3 | $Al_2O_3$.TiC | 1.0 | Stainless steel | 0.1 | 1.1 |
| 43 | 0.60 | 0.48 | 0.3 | $Al_2O_3$.TiC | 0.38 | Stainless steel | 0.1 | 1.1 |
| 44 | 0.30 | 0.25 | 0.3 | $Al_2O_3$.TiC | 0.10 | Stainless steel | 0.1 | 1.1 |
| 45 | 0.20 | 0.15 | 0.3 | $Al_2O_3$.TiC | 0.04 | Stainless steel | 0.1 | 1.1 |
| 46 | 5.6 | 3.9 | 1.9 | $Al_2O_3$.TiC | 181 | Stainless steel | 0.08 | 0.57 |
| 47 | 4.0 | 3.2 | 0.9 | $Al_2O_3$.TiC | 40 | Stainless steel | 0.08 | 0.57 |
| 48 | 2.9 | 2.3 | 0.7 | $Al_2O_3$.TiC | 15 | Stainless steel | 0.08 | 0.57 |
| 49 | 2.0 | 1.6 | 0.4 | $Al_2O_3$.TiC | 6.0 | Stainless steel | 0.08 | 0.57 |
| 50 | 1.25 | 1.0 | 0.3 | $Al_2O_3$.TiC | 2.0 | Stainless steel | 0.08 | 0.57 |

TABLE 1-continued

| Sample Number | Length L (mm) | Width W (mm) | Height H (mm) | Material | Mass (mg) | Support Spring | Thickness D (mm) | Load (gf) |
|---|---|---|---|---|---|---|---|---|
| 51 | 0.90 | 0.70 | 0.3 | $Al_2O_3.TiC$ | 1.0 | Stainless steel | 0.08 | 0.57 |
| 52 | 0.60 | 0.48 | 0.3 | $Al_2O_3.TiC$ | 0.38 | Stainless steel | 0.08 | 0.57 |
| 53 | 0.30 | 0.25 | 0.3 | $Al_2O_3.TiC$ | 0.10 | Stainless steel | 0.08 | 0.57 |
| 54 | 0.20 | 0.15 | 0.3 | $Al_2O_3.TiC$ | 0.04 | Stainless steel | 0.08 | 0.57 |
| 55 | 5.6 | 3.9 | 1.9 | $Al_2O_3.TiC$ | 181 | Stainless steel | 0.05 | 0.14 |
| 56 | 4.0 | 3.2 | 0.9 | $Al_2O_3.TiC$ | 40 | Stainless steel | 0.05 | 0.14 |
| 57 | 2.9 | 2.3 | 0.7 | $Al_2O_3.TiC$ | 15 | Stainless steel | 0.05 | 0.14 |
| 58 | 2.0 | 1.6 | 0.4 | $Al_2O_3.TiC$ | 6.0 | Stainless steel | 0.05 | 0.14 |
| 59 | 1.25 | 1.0 | 0.3 | $Al_2O_3.TiC$ | 2.0 | Stainless steel | 0.05 | 0.14 |
| 60 | 0.90 | 0.70 | 0.3 | $Al_2O_3.TiC$ | 1.0 | Stainless steel | 0.05 | 0.14 |
| 61 | 0.60 | 0.48 | 0.3 | $Al_2O_3.TiC$ | 0.38 | Stainless steel | 0.05 | 0.14 |
| 62 | 0.30 | 0.25 | 0.3 | $Al_2O_3.TiC$ | 0.10 | Stainless steel | 0.05 | 0.14 |
| 63 | 0.20 | 0.15 | 0.3 | $Al_2O_3.TiC$ | 0.04 | Stainless steel | 0.05 | 0.14 |
| 64 | 5.6 | 3.9 | 1.9 | $Al_2O_3.TiC$ | 181 | Stainless steel | 0.04 | 0.071 |
| 65 | 4.0 | 3.2 | 0.9 | $Al_2O_3.TiC$ | 40 | Stainless steel | 0.04 | 0.071 |
| 66 | 2.9 | 2.3 | 0.7 | $Al_2O_3.TiC$ | 15 | Stainless steel | 0.04 | 0.071 |
| 67 | 2.0 | 1.6 | 0.4 | $Al_2O_3.TiC$ | 6.0 | Stainless steel | 0.04 | 0.071 |
| 68 | 1.25 | 1.0 | 0.3 | $Al_2O_3.TiC$ | 2.0 | Stainless steel | 0.04 | 0.071 |
| 69 | 0.90 | 0.70 | 0.3 | $Al_2O_3.TiC$ | 1.0 | Stainless steel | 0.04 | 0.071 |
| 70 | 0.60 | 0.48 | 0.3 | $Al_2O_3.TiC$ | 0.38 | Stainless steel | 0.04 | 0.071 |
| 71 | 0.30 | 0.25 | 0.3 | $Al_2O_3.TiC$ | 0.10 | Stainless steel | 0.04 | 0.071 |
| 72 | 0.20 | 0.15 | 0.3 | $Al_2O_3.TiC$ | 0.04 | Stainless steel | 0.04 | 0.071 |
| 73 | 5.6 | 3.9 | 1.9 | $Al_2O_3.TiC$ | 181 | Stainless steel | 0.02 | 0.089 |
| 74 | 4.0 | 3.2 | 0.9 | $Al_2O_3.TiC$ | 40 | Stainless steel | 0.02 | 0.089 |
| 75 | 2.9 | 2.3 | 0.7 | $Al_2O_3.TiC$ | 15 | Stainless steel | 0.02 | 0.089 |
| 76 | 2.0 | 1.6 | 0.4 | $Al_2O_3.TiC$ | 6.0 | Stainless steel | 0.02 | 0.089 |
| 77 | 1.25 | 1.0 | 0.3 | $Al_2O_3.TiC$ | 2.0 | Stainless steel | 0.02 | 0.089 |
| 78 | 0.90 | 0.70 | 0.3 | $Al_2O_3.TiC$ | 1.0 | Stainless steel | 0.02 | 0.089 |
| 79 | 0.60 | 0.48 | 0.3 | $Al_2O_3.TiC$ | 0.38 | Stainless steel | 0.02 | 0.089 |
| 80 | 0.30 | 0.25 | 0.3 | $Al_2O_3.TiC$ | 0.10 | Stainless steel | 0.02 | 0.089 |
| 81 | 0.20 | 0.15 | 0.3 | $Al_2O_3.TiC$ | 0.04 | Stainless steel | 0.02 | 0.089 |
| 82 | 5.6 | 3.9 | 1.9 | $Al_2O_3.TiC$ | 181 | Stainless steel | 0.01 | 0.0011 |
| 83 | 4.0 | 3.2 | 0.9 | $Al_2O_3.TiC$ | 40 | Stainless steel | 0.01 | 0.0011 |
| 84 | 2.9 | 2.3 | 0.7 | $Al_2O_3.TiC$ | 15 | Stainless steel | 0.01 | 0.0011 |
| 85 | 2.0 | 1.6 | 0.4 | $Al_2O_3.TiC$ | 6.0 | Stainless steel | 0.01 | 0.0011 |
| 86 | 1.25 | 1.0 | 0.3 | $Al_2O_3.TiC$ | 2.0 | Stainless steel | 0.01 | 0.0011 |
| 87 | 0.90 | 0.70 | 0.3 | $Al_2O_3.TiC$ | 1.0 | Stainless steel | 0.01 | 0.0011 |
| 88 | 0.60 | 0.48 | 0.3 | $Al_2O_3.TiC$ | 0.38 | Stainless steel | 0.01 | 0.0011 |
| 89 | 0.30 | 0.25 | 0.3 | $Al_2O_3.TiC$ | 0.10 | Stainless steel | 0.01 | 0.0011 |
| 90 | 0.20 | 0.15 | 0.3 | $Al_2O_3.TiC$ | 0.04 | Stainless steel | 0.01 | 0.0011 |

(Example 2)

Figure 6:
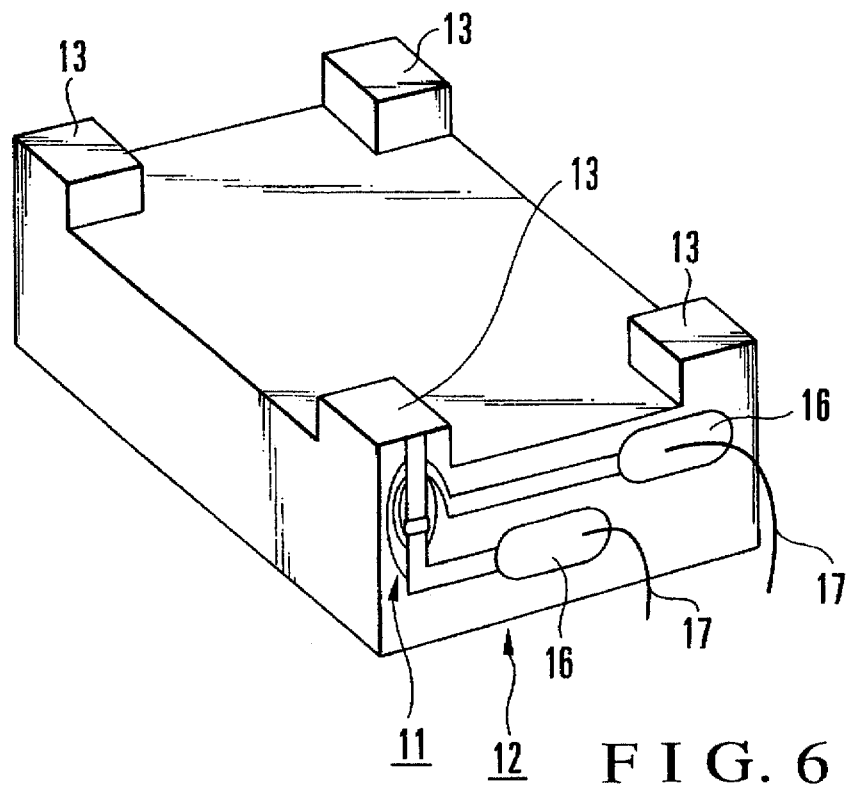
FIG. 6 is a perspective view showing still another example of the contact magnetic head slider shown in FIGS. 1 and 2.

Four contact pads 13 each having a flat surface, as shown in FIG. 6, were formed by machining to fabricate each contact magnetic head slider 12, as in Example 1. Then, each magnetic disk device 1 was fabricated. The contact pads 13 were arranged at four corners on the surface of the slider 12. A magnetic recording/reproducing element 11 was arranged on the rear end face of the slider 12 in correspondence with one of the contact pads 13 on the rear end side.

(Example 3)

Figure 7:
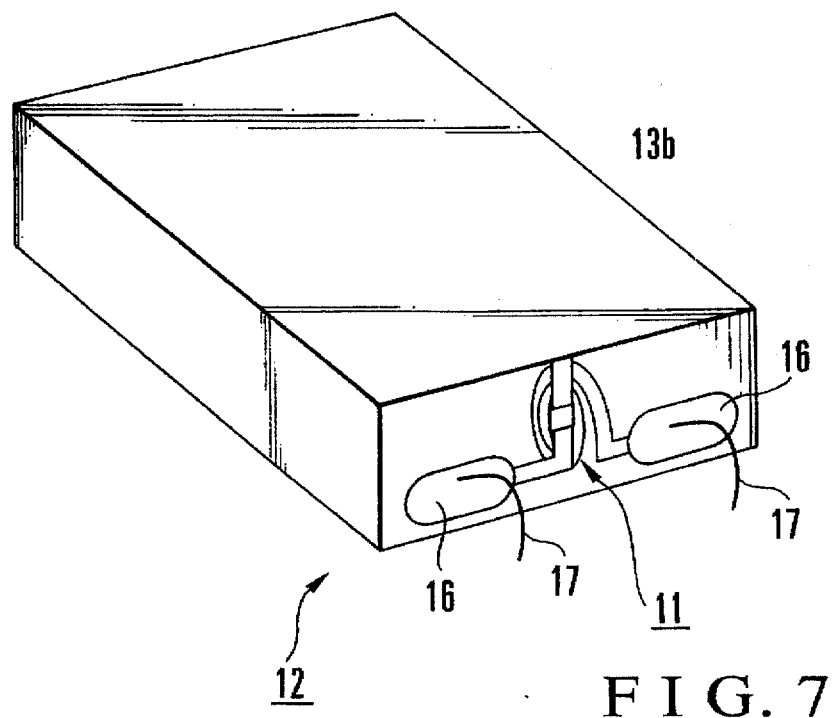
FIG. 7 is a perspective view showing still another example of the contact magnetic head slider shown in FIGS. 1 and 2.

A contact pad 13b having one flat surface, as shown in FIG. 7, was formed by machining on the entire surface of each slider 12 to fabricate each contact magnetic head slider 12, as in Example 1. Then, each magnetic disk device 1 was fabricated.

(Example 4)

Figure 4:
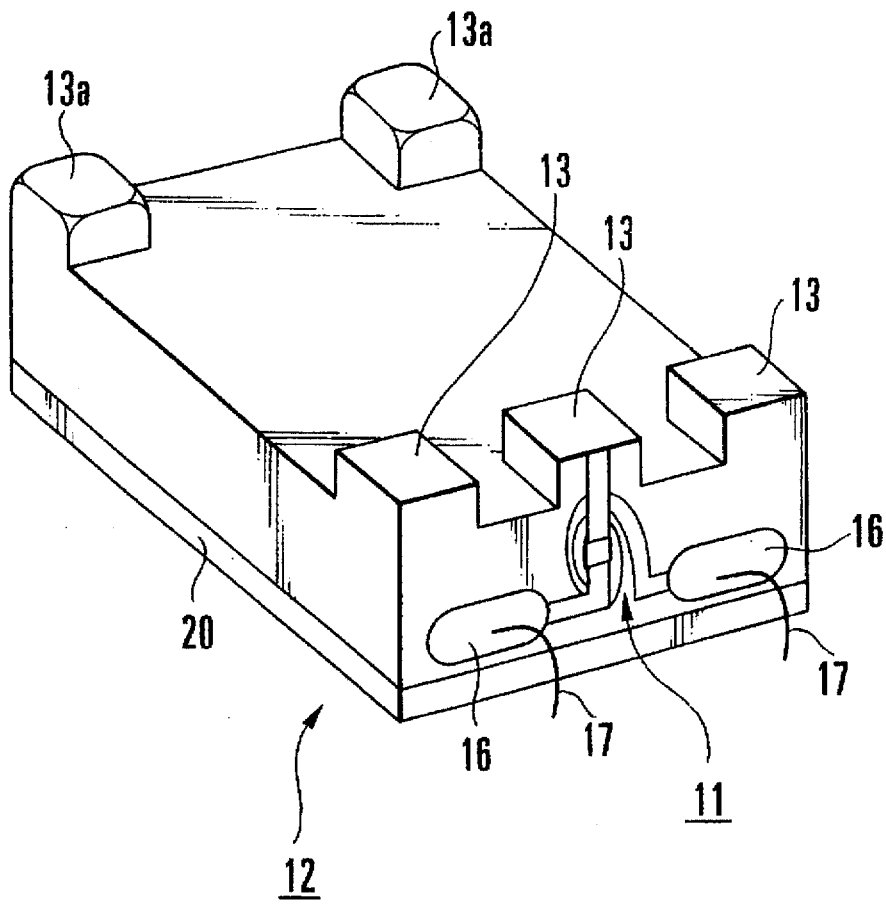
FIG. 4 is a perspective view showing another example of a contact magnetic head slider shown in FIGS. 1 and 2.

Three contact pads each having a curved surface (curvature: 50 nm), similar to contact pads 13a shown in FIG. 4, were formed by machining. As a modification of the magnetic head slider 12 in FIG. 3, each contact magnetic head slider was fabricated, as in Example 1. Then, each magnetic disk device was fabricated.

(Example 5)

Three contact pads 13 each having a flat surface, as shown in FIG. 3, were formed by machining to fabricate each contact magnetic head slider, as in Example 1. As shown in FIG. 4, a mass-applying layer 20 was formed on the rear surface of the slider 12. The mass-applying layer 20 includes a Ta, W, Hf, Pt, Au, Ag, Cu, Pb, Bi, U, Ir, Os, Pd, Nb, Fe, Co, Ni, V, Mo, Ru, Re, Rh, Zr, Cr, Cd, Zn, Sn, Tl, Mn, or Lu piece. Then, each magnetic disk device was fabricated.

Assume that the thickness and density of the mass-applying layer 20, and the density of the magnetic head slider are Dm, dm, and ds, respectively, and the contact slider in this example has a length L', a width W', and a height H which is equal to that in Example 1. When the ratio of the thickness of the mass-applying layer 20 to the slider height is defined as Sm=Dm/H, and the ratio of the density of the mass-applying layer 20 to the density of the slider base material is given as Ss=dm/ds, a size reduction ratio S=(L·W−L'·W')/(L·W) of the magnetic head slider in this example to the magnetic head slider in Example 1 is represented by $$S=Sm(Ss-1)/(1+Sm(Ss-1))$$

In this example, ds=4.25 g/cm³, and Sm was set at 0.2, i.e., the mass-applying layer 20 had a height 20% the height of the slides base material. Therefore, as the mass-applying layer 20, the Ta, W, Hf, Pt, Au, Ag, Cu, Pb, Bi, U, Ir, Os, Pd, Nb, Fe, Co, Ni, V, Mo, Ru, Re, Rh, Zr, Cr, Cd, Zn, Sn, Tl, Mn, and Lu pieces had the dm of 16.6, 19.3, 13.3, 21.4, 19.3, 10.5, 8.9, 11.3, 9.7, 19.0, 22.4, 22.6, 12.0, 8.6, 7.9, 8.9, 8.9, 6.1, 10.2, 12.4, 21.0, 12.4, 6.5, 7.2, 8.6, 7.1, 5.8, 11.8, 7.4, and 9.8 g/cm$^3$, and had the S of 0.37, 0.41, 0.30, 0.45, 0.41, 0.23, 0.18, 0.25, 0.20, 0.41, 0.46, 0.46, 0.27, 0.17, 0.15, 0.18, 0.18, 0.08, 0.22, 0.28, 0.44, 0.28, 0.09, 0.12, 0.17, 0.12, 0.07, 0.26, 0.13, and 0.21. That is, by providing the mass-applying layer 20, the magnetic slider could be downsized by 8 to 50%.

(Example 6)

Each contact magnetic head slider 12 was fabricated using a slider material of Ta, W, Hf, Pt, Au, Ag, Cu, Pb, Bi, U, Ir, Os, Pd, Nb, Fe, Co, Ni, V, Mo, Ru, Re, Rh, Zr, Cr, Cd, Zn, Sn, Tl, Mn, or Lu, as in Example 1. Then, each magnetic disk device 1 was fabricated. The magnetic head slider could be downsized by ds/dm.

(Example 7)

As in Example 1, each contact magnetic head slider 12 was fabricated using each magnetic head slider support mechanism, as each magnetic head slider support mechanism 14 shown in FIG. 3, consisting of phosphor bronze, silicon, or alumina, instead of stainless steel. Then, each magnetic disk device 1 was fabricated.

(Example 8)

As in Example 1, each magnetic disk device was fabricated using an aluminum alloy substrate prepared by electrolessly plating a hard magnetic disk substrate 30 of a hard magnetic disk medium 34 shown in FIG. 5, with NiP to a thickness of 10 μm, and mirror-polishing the resultant surface to have a surface roughness (Rtm) of 2 nm.

(Example 9)

As in Example 1, each magnetic disk device was fabricated using a carbon substrate as a hard magnetic disk substrate 30 of a hard magnetic disk medium 34 shown in FIG. 5.

(Example 10)

As in Example 1, each magnetic disk device was fabricated using a 3.5" polyester flexible magnetic disk having a thickness of 70 μm as a magnetic disk medium 2, instead of using a hard magnetic disk medium 34. A fiber pad was attached to the lower surface of this medium which was to be brought in contact with a contact magnetic head slider.

In Examples 2 to 9, the slider material or the size of the magnetic head slider support mechanism were changed, while the load and mass were set to be equal to those of samples 1 to 90 in Example 1.

Magnetic disk devices were fabricated using the contact magnetic heads and the hard magnetic disk media fabricated in Examples 1 to 9. Each hard magnetic disk medium was brought in continuous contact with the contact magnetic head at 5,400 rpm to check the total wear depth of each contact pad 13 after 1,000 h and the flying height of the contact magnetic head. In Example 10, a continuous sliding test was conducted under the proper test condition of 1 min to 2,000 h in accordance with the degree of wear, while the fabricated contact magnetic head was brought in continuous contact with the 3.5" flexible magnetic disk medium at 360 rpm. The wear rate was checked based on the total wear depth of each contact pad 13, and also the flying height of the contact magnetic head and the variation in reproduced signal (ratio of the minimum amplitude to the maximum amplitude of the waveform) were checked.

Figure 8:
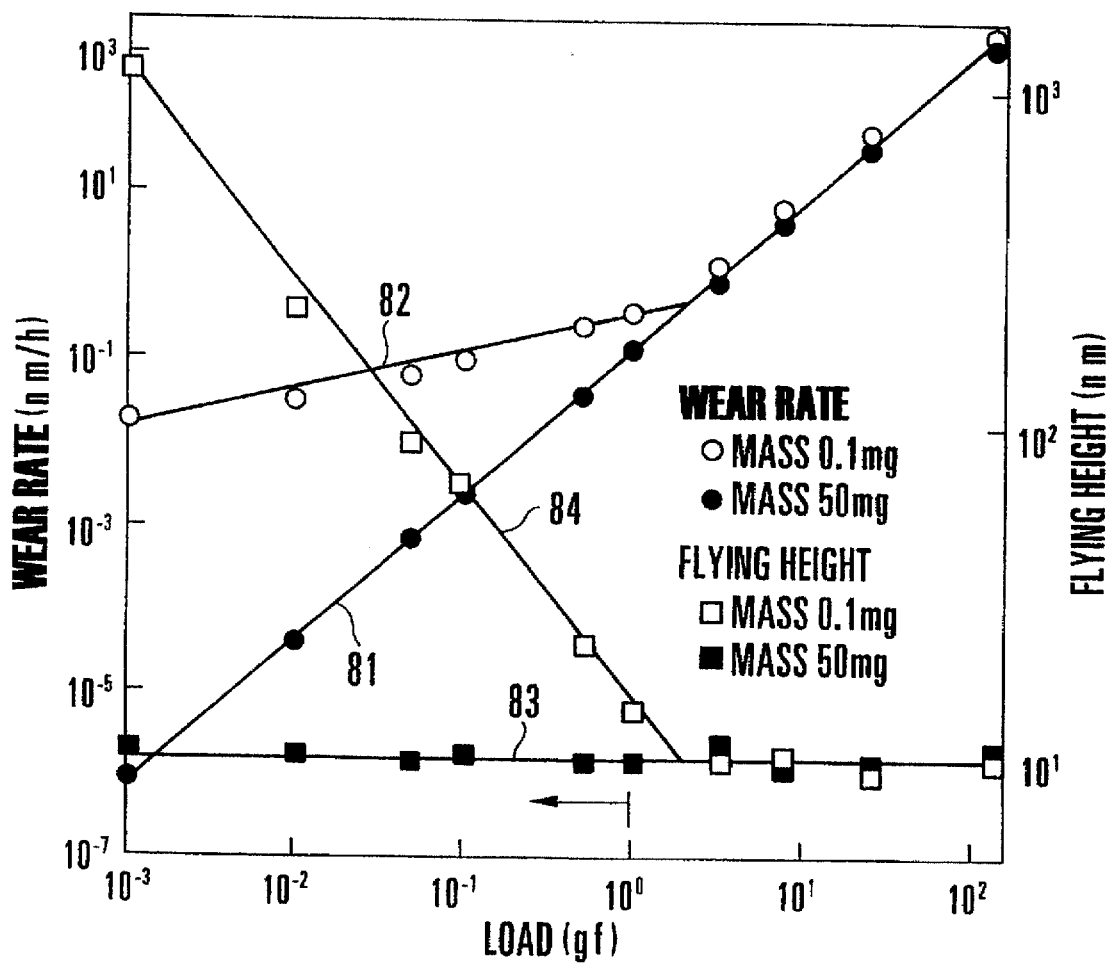
FIG. 8 is a graph showing the wear rate and the dependence of the flying height on the load in the contact magnetic head slider used in the magnetic disk device of the present invention, using the mass as a parameter.

Note that the wear depth was measured by using an atomic force microscope or a scanning electron microscope, and the flying height was measured by a laser Doppler vibrometer. These results are shown in Table 2, while the representative values of results corresponding to combinations of the mass and load are shown in FIGS. 8 and 9.

TABLE 2

| Sample Number | Mass (mg) | Load (gf) | Wear Rate (nm/h) | Flying Height (nm) | Variation in Reproduced Signal |
|---|---|---|---|---|---|
| 1 | 181 | 139 | 8.0E2 | 10 | 2 |
| 2 | 40 | 139 | 7.0E2 | 11 | 2 |
| 3 | 15 | 139 | 9.0E2 | 10 | 2 |
| 4 | 6.0 | 139 | 7.0E2 | 10 | 3 |
| 5 | 2.0 | 139 | 7.0E2 | 10 | 2 |
| 6 | 1.0 | 139 | 8.0E2 | 9 | 2 |
| 7 | 0.38 | 139 | 7.0E2 | 10 | 3 |
| 8 | 0.10 | 139 | 8.0E2 | 10 | 3 |
| 9 | 0.04 | 139 | 7.0E2 | 9 | 3 |
| 10 | 181 | 30 | 5.0E1 | 9 | 2 |
| 11 | 40 | 30 | 4.0E1 | 10 | 3 |
| 12 | 15 | 30 | 6.0E1 | 10 | 4 |
| 13 | 6.0 | 30 | 4.0E1 | 10 | 3 |
| 14 | 2.0 | 30 | 4.0E1 | 9 | 2 |
| 15 | 1.0 | 30 | 6.0E1 | 11 | 5 |
| 16 | 0.38 | 30 | 4.0E1 | 10 | 2 |
| 17 | 0.10 | 30 | 5.0E1 | 9 | 2 |
| 18 | 0.04 | 30 | 4.0E1 | 9 | 3 |
| 19 | 181 | 8.9 | 7.0E0 | 11 | 5 |
| 20 | 40 | 8.9 | 7.0E0 | 11 | 4 |
| 21 | 15 | 8.9 | 8.0E0 | 12 | 6 |
| 22 | 6.0 | 8.9 | 8.0E0 | 10 | 3 |
| 23 | 2.0 | 8.9 | 9.0E0 | 10 | 4 |
| 24 | 1.0 | 8.9 | 8.0E0 | 12 | 6 |
| 25 | 0.38 | 8.9 | 9.0E0 | 10 | 5 |
| 26 | 0.10 | 8.9 | 9.0E0 | 10 | 4 |
| 27 | 0.04 | 8.9 | 9.0E0 | 11 | 5 |
| 28 | 181 | 3.76 | 1.0E0 | 10 | 4 |
| 29 | 40 | 3.76 | 1.0E0 | 10 | 4 |
| 30 | 15 | 3.76 | 9.0E-1 | 10 | 3 |
| 31 | 6.0 | 3.76 | 1.0E0 | 10 | 4 |
| 32 | 2.0 | 3.76 | 1.0E0 | 11 | 5 |
| 33 | 1.0 | 3.76 | 9.0E-1 | 10 | 4 |
| 34 | 0.38 | 3.76 | 9.0E-1 | 11 | 4 |
| 35 | 0.10 | 3.76 | 1.0E0 | 11 | 4 |
| 36 | 0.04 | 3.76 | 1.0E0 | 11 | 5 |
| 37 | 181 | 1.1 | 1.0E-1 | 10 | 5 |
| 38 | 40 | 1.1 | 1.0E-1 | 10 | 4 |
| 39 | 15 | 1.1 | 1.0E-1 | 10 | 5 |
| 40 | 6.0 | 1.1 | 2.0E-1 | 12 | 6 |
| 41 | 2.0 | 1.1 | 1.0E-1 | 13 | 5 |
| 42 | 1.0 | 1.1 | 2.0E-1 | 14 | 6 |
| 43 | 0.38 | 1.1 | 3.0E-1 | 16 | 6 |
| 44 | 0.10 | 1.1 | 4.0E-1 | 18 | 7 |
| 45 | 0.04 | 1.1 | 5.0E-1 | 20 | 7 |
| 46 | 181 | 0.75 | 6.0E-1 | 10 | 4 |
| 47 | 40 | 0.75 | 5.0E-2 | 10 | 4 |
| 48 | 15 | 0.75 | 7.0E-2 | 14 | 5 |
| 49 | 6.0 | 0.75 | 8.0E-2 | 16 | 6 |
| 50 | 2.0 | 0.75 | 1.1E-1 | 19 | 6 |
| 51 | 1.0 | 0.75 | 1.3E-1 | 22 | 6 |
| 52 | 0.38 | 0.75 | 1.6E-1 | 26 | 6 |
| 53 | 0.10 | 0.75 | 2.0E-1 | 30 | 7 |
| 54 | 0.04 | 0.75 | 2.6E-1 | 34 | 8 |
| 55 | 181 | 0.14 | 1.1E-3 | 10 | 4 |
| 56 | 40 | 0.14 | 3.0E-3 | 10 | 3 |
| 57 | 15 | 0.14 | 7.0E-3 | 22 | 7 |
| 58 | 6.0 | 0.14 | 1.0E-2 | 30 | 7 |
| 59 | 2.0 | 0.14 | 3.0E-2 | 43 | 8 |
| 60 | 1.0 | 0.14 | 5.3E-2 | 51 | 10 |
| 61 | 0.38 | 0.14 | 7.1E-2 | 62 | 13 |
| 62 | 0.10 | 0.14 | 9.0E-2 | 70 | 14 |
| 63 | 0.04 | 0.14 | 1.5E-1 | 81 | 18 |
| 64 | 181 | 0.071 | 7.0E-4 | 10 | 5 |
| 65 | 40 | 0.071 | 9.0E-4 | 10 | 4 |
| 66 | 15 | 0.071 | 3.0E-3 | 15 | 6 |
| 67 | 6.0 | 0.071 | 7.0E-3 | 21 | 7 |

TABLE 2-continued

| Sample Number | Mass (mg) | Load (gf) | Wear Rate (nm/h) | Flying Height (nm) | Variation in Reproduced Signal |
|---|---|---|---|---|---|
| 68 | 2.0 | 0.071 | 2.1E-2 | 33 | 7 |
| 69 | 1.0 | 0.071 | 5.0E-2 | 56 | 10 |
| 70 | 0.38 | 0.071 | 6.5E-2 | 73 | 14 |
| 71 | 0.10 | 0.071 | 7.0E-2 | 90 | 20 |
| 72 | 0.04 | 0.071 | 1.3E-1 | 110 | 29 |
| 73 | 181 | 0.089 | 1.5E-5 | 10 | 2 |
| 74 | 40 | 0.089 | 3.0E-5 | 10 | 2 |
| 75 | 15 | 0.089 | 6.0E-5 | 9 | 2 |
| 76 | 6.0 | 0.089 | 7.0E-5 | 15 | 4 |
| 77 | 2.0 | 0.089 | 1.0E-6 | 20 | 6 |
| 78 | 1.0 | 0.089 | 2.0E-3 | 30 | 40 |
| 79 | 0.38 | 0.089 | 4.0E-3 | 50 | 49 |
| 80 | 0.10 | 0.089 | 5.0E-2 | 300 | 58 |
| 81 | 0.04 | 0.089 | 7.0E-2 | 700 | 70 |
| 82 | 181 | 0.0011 | 4.0E-7 | 10 | 2 |
| 83 | 40 | 0.0011 | 8.0E-7 | 11 | 5 |
| 84 | 15 | 0.0011 | 1.2E-6 | 33 | 7 |
| 85 | 6.0 | 0.0011 | 1.7E-6 | 51 | 10 |
| 86 | 2.0 | 0.0011 | 2.1E-5 | 88 | 15 |
| 87 | 1.0 | 0.0011 | 1.5E-4 | 250 | 52 |
| 88 | 0.38 | 0.0011 | 1.1E-3 | 410 | 58 |
| 89 | 0.10 | 0.0011 | 2.0E-2 | 1200 | 71 |
| 90 | 0.04 | 0.0011 | 9.3E-2 | 2500 | 80 |

From the results in FIG. 8, it was found that the wear rate abruptly decreased with a decrease in load, the decrease was constant with a high mass, as indicated by a characteristic sample 81, and the decrease of the wear rate was moderated with a low mass and a load of 1 gf or less, as indicated by a characteristic sample 82. As for the flying height, it was found that the flying height showed small values in cases of heavy load regardless of the mass, showed constantly small values in cases of high mass with a load of 1 gf or less even if the load was decreased, as indicated by a characteristic sample 83, and abruptly increased with a decrease in load in cases of low mass, as indicated by a characteristic sample 84. Referring to FIG. 9, the wear rate was constant in cases of heavy load regardless of the mass though its absolute value was large, as indicated by a characteristic sample 91. In cases of light load, it was found that the wear rate was extremely low with a mass of 2 mg or more, as indicated by a characteristic sample 92, and increased by about 100 times with a mass of 1 mg or less. In addition, as for the flying height, it was found that the flying height showed small values in a high-mass region regardless of the load, the dependence on mass was not observed in a low-mass region in cases of heavy load, as indicated by a characteristic sample 93, and the flying height abruptly increased with a mass of 1 mg or less in cases of light load, as indicated by a characteristic sample 94. More specifically, it was found that a low wear rate and a small flying height could be obtained in the region where the load was 1 gf or less and the mass was 2 mg or more. Further, in a light-load, low-mass region, it was found that the wear rate was lower than that in a heavy-load region while the flying height was larger, both of which were larger than those in the region where the load was 1 gf or less, and the mass was 2 mg or more, i.e., in a light-load, high-mass region. This indicates that the wear rate simply decreases with a decrease in load in a heavy-load region, and does not greatly decrease in a low-mass region due to the large impact energy caused by flying.

The same results were obtained by contact magnetic heads in which the contact pad shape, the magnetic head slider material, the structure provided with the mass-applying layer, and the magnetic head slider support mechanism material in Examples 2 to 7 were changed.

In the magnetic disk device using a flexible magnetic disk medium in Example 10, although the wear rate and the flying height were larger by about 100 times than those in the magnetic disk devices using hard magnetic disk media in Examples 1 to 9, the same tendency was observed. That is, both the wear rate and the flying height in the region where the load was 1 gf or less, and the mass was 2 mg or more were smaller than those in remaining regions. This indicates that the substrate softness increases wear and the flying height, but the relative tendency is unchanged.

The variation in reproduced signal (ratio of the minimum amplitude to the maximum amplitude of a waveform) sent from a magnetic recording/reproducing element, which was caused by flying of a magnetic head slider, was checked at a track density of 1,000 TPI (track density per inch). As a result, it was found that the variation value was minimized with a load of 1 gf or less and a mass of 2 mg or more, as shown in Table 2. Also, the variation in reproduced signal was checked under conditions in which track shift caused by a twisted vibration at a track density of 10,000 TPI became remarkable, to find that the variation increased 20% compared to the case of the above low track density. Note that the variation in reproduced signal is expressed by $100 \times (V_X - V_N)/V_X$ where $V_X$ is the maximum value of a reproduced signal voltage for one track, and $V_N$ is the minimum reproduced output voltage.

In each of the magnetic disk devices in Examples 5 and 6, the recording capacitance per one magnetic disk surface increased 5 to 10% because downsizing of the magnetic head slider achieved an increase in the usable number of tracks.

Note that the types, forming methods, and the like of the thin magnetic film 31, the protective film 32, the lubricant 33, which are shown in FIG. 5 and used for the magnetic disk medium, or a protective film formed on the contact pad 13 of the magnetic head slider 12, and the like are not particularly limited to those in the above examples. Well-known materials and forming methods can be employed without any limitation.

In the magnetic disk device of the present invention, therefore, the wear rate and the flying height at least a fraction of several hundreds to a fraction of several thousands, and the flying height a fraction of several tens those in a conventional magnetic disk device could be assured. In addition, the surface recording density (product of the line recording density and the track density) 10 times larger than the conventional value could be obtained by using the magnetic disk device of the present invention.

As has been described above, as shown in the side view of FIG. 1 and the front view of FIG. 2, the magnetic disk device 1 of the present invention is constituted by the magnetic disk medium 2, the motor 8 for rotating the magnetic disk medium 2, the contact magnetic head 3, the head arm 4 supporting the contact magnetic head 3, the actuator 5 for moving (tracking) the contact magnetic head 3 and the head arm 4 in the radial direction of the magnetic disk medium, the base 7 for fixing the motor 8 and the actuator 5, and the cover 6 for shielding the interior of the magnetic disk device from the outer air. Dust, corrosive gases such as $SO_x$, $NO_x$, $H_2O$, $H_2S$, and $NH_3$, and an organic gas are removed through the filter 9 to keep the outer air and the pressure constant.

The contact magnetic head 3 of the present invention is characterized by having a press load of 1 gf or less and a mass of 2 mg or more. As for its arrangement, e.g., as shown in FIG. 3, the contact pads 13 are formed on the surface of the magnetic head slider 12 having the magnetic recording/reproducing element 11, and the support mechanism 14 supports the slider 12. Another shape of the contact pad 13 is a projecting shape having n flat or curved surfaces, as shown in FIG. 4, and the number (n) and the layout are arbitrary. Examples of the material of the magnetic head slider 12 are a substance of Si, Ge, diamond, diamond-like carbon, amorphous carbon, Ta, W, Hf, Pt, Au, Ag, Cu, Pb, Bi, U, Ir, Os, Pd, Nb, Fe, Co, Ni, V, Mo, Ru, Re, Rh, Zr, Cr, Cd, Zn, Sn, Tl, Mn, or Lu; an oxide such as $Al_2O_3$, $SiO_2$, $TiO_2$, $ZrO_2$, ferrite, BeO, glass, $BaTiO_3$, or $CaTiO_3$; a carbide such as SiC, TiC, ZrC, HfC, WC, or $B_4C$; a nitride such as cubic BN, TiN, $Si_3N_4$, or AlN; or a composite material of them such as $Al_2O_3$—TiC, $Al_2O_3$—$TiO_2$, $Al_2O_3$—SiC, $Al_2O_3$—$ZrO_2$, $Al_2O_3$-cubic BN, BeO—TiC, or $ZrO_2$—$Y_2O_3$. The mass of the magnetic head slider 12 can be increased by a structure in which the high-density mass-applying layer 20 consisting of Ta, W, Hf, Pt, Au, Ag, Cu, Pb, Bi, U, Ir, Os, Pd, Nb, Fe, Co, Ni, V, Mo, Ru, Re, Rh, Zr, Cr, Cd, Zn, Sn, Tl, Mn, or Lu is applied or adhered to the above base material, as shown in FIG. 4. Examples of the material of the magnetic head slider support mechanism (to be referred to as a support spring hereinafter) 14 are stainless steel, phosphor bronze, silicon, and alumina, which are effective materials for a spring. An electrical signal generated in the magnetic recording/reproducing element 11 is transmitted from an electrode 16 to an electrode 15 through a lead wire 17, and then sent to a circuit from a wiring film 18 formed on the support spring through an electrode 19. The surface of the contact pad 13 may be covered with a film such as amorphous carbon, diamond-like carbon, diamond, $SiO_2$, $ZrO_2$, $Si_3N_4$, SiC, or $B_4C$.

As shown in FIG. 5, the hard magnetic disk medium 34 constitutes the magnetic disk medium 2 for magnetically storing information using the contact magnetic head 3 used in the magnetic disk device 1 of the present invention. The hard magnetic disk medium 34 is constituted by the hard magnetic disk substrate 30 consisting of an aluminum alloy which is coated with NiP or anodized aluminum and has a mirror-finished surface, or of a Ti alloy, glass, or carbon, the thin magnetic film (e.g., a thin magnetic film consisting of a Co-based material such as CoCr, CoCrTa, CoNiPt, CoCrPt, or CoNiP, or ferrites such as $\gamma$-$Fe_2O_3$ and Ba ferrite) 31 formed thereon, the protective film (e.g., amorphous carbon, carbon hydroxide, diamond-like carbon, diamond, $SiO_2$, or $ZrO_2$) 32 formed thereon, and the lubricant (e.g., perfluoropolyether) formed thereon.

According to the magnetic disk device of the present invention constituted by the magnetic disk medium, the contact magnetic head, the head arm, the actuator, the cover, the base, the motor, and the filter, wear and flying could be prevented by setting the load and mass of the magnetic head slider, which constituted the contact magnetic head, to 1 gf or less and 2 mg or more. The output variation in reproduced signal caused by a high track density could be minimized, and both a high line recording density and a high track density could be achieved.

The magnetic head slider could be downsized by using a high-density slider material or providing the mass-applying layer, thereby increasing the recording capacity.

What is claimed is:

1. A magnetic disk device comprising: a magnetic head for performing recording and reproduction with respect to a magnetic disk medium; and driving means for driving said magnetic head, wherein said magnetic head comprises:
   a magnetic recording/reproducing element;
   a contact magnetic head slider on which said magnetic recording/reproducing element is mounted, said magnetic head slider having a press load of not more than 1 gf, and a mass of not less than 2 mg; and
   a support mechanism for supporting said magnetic head slider.

2. A device according to claim 1, further comprising at least one contact pad which is formed on a surface of said magnetic head slider and contacts said magnetic disk medium.

3. A device according to claim 2, wherein said contact pad has a flat surface which contacts said magnetic disk medium.

4. A device according to claim 2, wherein said contact pad has a curved surface which contacts said magnetic disk medium.

5. A device according to claim 1, wherein said magnetic head slider consists of, as a base material, one material selected from the group consisting of $Al_2O_3$—TiC, $Al_2O_3$—$TiO_2$, $Al_2O_3$—SiC, $Al_2O_3$—$ZrO_2$, $Al_2O_3$-cubic BN, BeO—TiC, SiC, diamond-like carbon, amorphous carbon, alumina, cubic BN, and BeO.

6. A device according to claim 1, wherein said magnetic head slider consists of, as a base material, one material selected from the group consisting of Ta, W, Hf, Pt, Au, Ag, Cu, Pb, Bi, U, Ir, Os, Pd, Nb, Fe, Co, Ni, V, Mo, Ru, Re, Rh, Zr, Cr, Cd, Zn, Sn, Ti, Mn, and Lu, and an oxide, a nitride, a carbon compound, and a composite material thereof.

7. A device according to claim 1, further comprising a mass-applying layer which is formed on a lower surface of said magnetic head slider to increase a mass.

8. A device according to claim 7, wherein said magnetic head slider consists of, as a base material, one material selected from the group consisting of $Al_2O_3$—TiC, $Al_2O_3$—$TiO_2$, $Al_2O_3$—SiC, $Al_2O_3$—$ZrO_2$, $Al_2O_3$-cubic BN, BeO—TiC, SiC, diamond-like carbon, amorphous carbon, alumina, cubic BN, and BeO, and said mass-applying layer consists of, as a base material, one material selected from the group consisting of Ta, W, Hf, Pt, Au, Ag, Cu, Pb, U, Ir, Os, Pd, Bi, Nb, Fe, Co, Ni, V, Mo, Ru, Re, Rh, Zr, Cr, Cd, Zn, Sn, Ti, Mn, and Lu, and an oxide, a nitride, a carbon compound, and a composite material thereof.

9. A device according to claim 1, wherein said support mechanism comprises a plate-shaped support spring and the press load of said magnetic head slider is applied by said support spring.

10. A device according to claim 9, wherein said device is constructed such that the press load of said magnetic head slider is set by the thickness of said support spring.

11. A magnetic head comprising:
    a magnetic recording/reproducing element for performing recording and reproduction with respect to a magnetic disk medium;
    a contact magnetic head slider on which said magnetic recording/reproducing element is mounted, said magnetic head slider having a press load of not more than 1 gf, and a mass of not less than 2 mg; and
    a support mechanism for supporting said magnetic head slider.

12. A head according to claim 11, further comprising a mass-applying layer which is formed on a lower surface of said magnetic head slider to increase a mass.

13. A contact magnetic head slider assembly comprising a contact magnetic head slider supported by a support mechanism, said contact magnetic head slider having a press load of not more than 1 gf and a mass of not less than 2 mg.

14. An assembly according to claim 13, wherein said magnetic head slider comprises, as a base material, a material selected from the group consisting of $Al_2O_3$—TiC, $Al_2O_3$—$TiO_2$, $Al_2O_3$—SiC, $Al_2O_3$—$ZrO_2$, $Al_2O_3$-cubic BN, BeO—TiC, SiC, diamond-like carbon, amorphous carbon, alumina, cubic BN, and BeO.

15. A magnetic disk device comprising: a magnetic head for performing recording and reproduction with respect to a magnetic disk medium; and driving means for driving said magnetic head, wherein said magnetic head comprises:

a magnetic recording/reproducing element;

a contact magnetic head slider on which said magnetic recording/reproducing element is mounted, said magnetic head slider consisting of, as a base material, a material selected from the group consisting of $Al_2O_3$—TiC, $Al_2O_3$—$TiO_2$, $Al_2O_3$—SiC, $Al_2O_3$—$ZrO_2$, $Al_2O_3$-cubic BN, BeO—TiC, SiC, diamond-like carbon, amorphous carbon, alumina, cubic BN, and BeO, said magnetic head slider having a press load of not more than 1 gf, and a mass of not less than 2 mg; and a support mechanism for supporting said magnetic head slider.

16. A device according to claim 15, wherein said magnetic head slider consists of, as a base material, a material selected from the group consisting of Ta, W, Hf, Pt, An, Ag, Cu, Pb, Bi, U, Ir, Os, Pd, Nb, Fe, Co, Ni, V, Mo, Ru, Re, Rh, Zr, Cr, Cd, Zn, Sn, Ti, Mn, and Lu, and an oxide, a nitride, a carbon compound, and a composite material thereof.

17. A device according to claim 15, further comprising a mass-applying layer which is formed on a lower surface of said magnetic head slider to increase the mass thereof.

18. A device according to claim 15, further comprising at least one contact pad which is formed on a surface of said magnetic head slider and contacts said magnetic disk medium.

19. A device according to claim 18, wherein said contact pad has a flat surface which contacts said magnetic disk medium.

20. A device according to claim 18, wherein said contact pad has a curved surface which contacts said magnetic disk medium.

21. A magnetic disk device comprising: a magnetic head for performing recording and reproduction with respect to a magnetic disk medium; and driving means for driving said magnetic head, wherein said magnetic head comprises:

a magnetic recording/reproducing element;

a contact magnetic head slider on which said magnetic recording/reproducing element is mounted, said magnetic head slider consisting of, as a base material, a material selected from the group consisting of $Al_2O_3$—TiC, $Al_2O_3$—$TiO_2$, $Al_2O_3$—SiC, $Al_2O_3$—$ZrO_2$, $Al_2O_3$-cubic BN, BeO—TiC, SiC, diamond-like carbon, amorphous carbon, alumina, cubic BN, and BeO, and further comprising a mass-applying layer which is formed on a lower surface of said magnetic head slider to increase mass, said mass-applying layer consisting of, as a base material, a material selected from the group consisting of Ta, W, Hf, Pt, Au, Ag, Cu, Pb, U, Ir, Os, Pd, Bi, Nb, Fe, Co, Ni, V, Mo, Ru, Re, Rh, Zr, Cr, Cd, Zn, Sn, Ti, Mn, and Lu, and an oxide, a nitride, a carbon compound, and a composite material thereof, said magnetic head slider having a press load of not more than 1 gf, and a mass of not less than 2 mg; and a support mechanism for supporting said magnetic head slider.

\* \* \* \* \*

UNITED STATES PATENT AND TRADEMARK OFFICE
CERTIFICATE OF CORRECTION

PATENT NO.   :   5,673,161
DATED        :   September 30, 1997
INVENTOR(S)  :   YANAGISAWA et al It is certified that error appears in the above-indentified patent and that said Letters Patent is hereby corrected as shown below:

Claim 16, column 13, line 25, change "An" to --Au--.

Signed and Sealed this

Thirtieth Day of December, 1997

*Attest:*

BRUCE LEHMAN

*Attesting Officer*   Commissioner of Patents and Trademarks